United States Patent
Omoda et al.

(10) Patent No.: US 12,253,454 B2
(45) Date of Patent: Mar. 18, 2025

(54) CORROSION SENSOR DESIGNING METHOD, CORROSION SENSOR MANUFACTURING METHOD, AND CORROSION SENSOR

(71) Applicant: JFE STEEL CORPORATION, Tokyo (JP)

(72) Inventors: Masataka Omoda, Tokyo (JP); Shinji Otsuka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 117 days.

(21) Appl. No.: 17/922,857

(22) PCT Filed: May 19, 2021

(86) PCT No.: PCT/JP2021/018942
§ 371 (c)(1),
(2) Date: Nov. 2, 2022

(87) PCT Pub. No.: WO2021/235475
PCT Pub. Date: Nov. 25, 2021

(65) Prior Publication Data
US 2023/0152209 A1    May 18, 2023

(30) Foreign Application Priority Data

May 19, 2020 (JP) ................................. 2020-087264

(51) Int. Cl.
*G01N 17/04* (2006.01)

(52) U.S. Cl.
CPC .................................... *G01N 17/04* (2013.01)

(58) Field of Classification Search
CPC ..................................................... G01N 17/04
See application file for complete search history.

(56) References Cited

U.S. PATENT DOCUMENTS

2014/0111229 A1    4/2014  Hamann et al.

FOREIGN PATENT DOCUMENTS

| JP | 2016-197102 A |   | 11/2016 |
| JP | 2017003376 A | * | 1/2017 |

(Continued)

OTHER PUBLICATIONS

Translation of JP 2020-063989 A (Year: 2020).*

(Continued)

*Primary Examiner* — Paresh Patel
(74) *Attorney, Agent, or Firm* — Oliff PLC

(57) ABSTRACT

A corrosion sensor is an electric resistance type corrosion sensor including a sensor portion exposed to an arbitrary environment and formed of an electric conductor, and a reference portion isolated from the arbitrary environment and formed of an electric conductor, and measuring a corrosion loss of the sensor portion based on an electric resistance value of the reference portion and an electric resistance value of the sensor portion. A width of the sensor portion is set to satisfy Formula (II): $w \geq (32 \times t_{limit})$ ... (II), $t_{limit}$: maximum corrosion loss to be measured [mm], and w: width of the sensor portion [mm].

8 Claims, 2 Drawing Sheets

(56) References Cited

FOREIGN PATENT DOCUMENTS

JP         2018-163144 A     10/2018
JP         2020-063989 A      4/2020

OTHER PUBLICATIONS

Translation of JP 2017078700 A (Year: 2017).*
Aug. 17, 2021 International Search Report issued in International Patent Application No. PCT/JP2021/018942.
Oct. 2, 2023 extended Search Report issued in European Patent Application No. 21809101.5.
Sep. 4, 2024 Office Action issued in Korean Patent Application No. 10-2022-7039139.

* cited by examiner

CORROSION SENSOR DESIGNING METHOD, CORROSION SENSOR MANUFACTURING METHOD, AND CORROSION SENSOR

TECHNICAL FIELD

The present invention relates to a method of designing a corrosion sensor, a method of producing a corrosion sensor, and a corrosion sensor.

BACKGROUND ART

Electric resistance type corrosion sensors have been known for a technique of evaluating corrosion of metal materials.

An electric resistance type corrosion sensor includes a sensor portion (electric conductor) that is exposed to a corrosive environment to corrode, and a reference portion (electric conductor) that is isolated from a corrosive environment, and obtains a corrosion loss of the sensor portion based on an electric resistance value of the reference portion and an electric resistance value, which increases due to corrosion, of the sensor portion.

Patent Literature 1 discloses a technique of appropriately setting an initial thickness of a sensor portion.

CITATION LIST

Patent Literature

Patent Literature 1: JP 2016-197102 A

SUMMARY OF INVENTION

Technical Problems

The inventors of the present invention have discovered that precision of corrosion loss measurement is sometimes insufficient even if only an initial thickness of a sensor portion is appropriately set.

The present invention has been made in view of the foregoing and aims at providing a method of designing a corrosion sensor according to which a corrosion sensor having excellent precision of corrosion loss measurement can be obtained.

Solution to Problems

The present inventors found, through an earnest study, that employing the configuration described below enables the achievement of the above-mentioned object, and the invention has been completed.

Specifically, the present invention provides the following [1] to [7].

[1] A method of designing a corrosion sensor, the corrosion sensor being an electric resistance type corrosion sensor, and the electric resistance type corrosion sensor including a sensor portion exposed to an arbitrary environment and formed of an electric conductor, and a reference portion isolated from the arbitrary environment and formed of an electric conductor, and measuring a corrosion loss of the sensor portion based on an electric resistance value of the reference portion and an electric resistance value of the sensor portion, wherein a width of the sensor portion is set to satisfy Formula (II) below:

$$w \geq (32 \times t_{limit}) \quad (II),$$

$t_{limit}$: maximum corrosion loss to be measured [mm], and
w: width of the sensor portion [mm].

[2] The method of designing a corrosion sensor according to [1], wherein an initial thickness of the sensor portion is set to satisfy Formula (I) below:

$$t_{init} \geq (2 \times t_{limit}) \quad (I),$$

$t_{init}$: initial thickness of the sensor portion [mm], and
$t_{limit}$: maximum corrosion loss to be measured [mm].

[3] The method of designing a corrosion sensor according to [1] or [2], wherein a length of the sensor portion is set to satisfy Formula (III) below:

$$10^3 \leq \{L/(w \times t_{init})\} \times I \quad (III),$$

$t_{init}$: initial thickness of the sensor portion [mm],
w: width of the sensor portion [mm],
L: length of the sensor portion [mm], and
I: current value [mA].

[4] The method of designing a corrosion sensor according to any one of [1] to [3], wherein a width and an initial thickness of the sensor portion are set to satisfy Formula (VII) below:

$$(w/t_{init}) \geq 16 \quad (VII),$$

w: width of the sensor portion [mm], and
$t_{init}$: initial thickness of the sensor portion [mm].

[5] A method of producing an electric resistance type corrosion sensor including a sensor portion exposed to an arbitrary environment and formed of an electric conductor, and a reference portion isolated from the arbitrary environment and formed of an electric conductor, the method comprising designing the sensor portion according to the method of designing a corrosion sensor according to any one of [1] to [4].

[6] The method of producing a corrosion sensor according to [5], the method further comprising laminating the sensor portion and the reference portion via an insulator.

[7] A corrosion sensor which is an electric resistance type corrosion sensor including a sensor portion exposed to an arbitrary environment and formed of an electric conductor, and a reference portion isolated from the arbitrary environment and formed of an electric conductor, and measuring a corrosion loss of the sensor portion based on an electric resistance value of the reference portion and an electric resistance value of the sensor portion,
wherein a width and a thickness of the sensor portion satisfy Formula (VII) below:

$$(w/t_{init}) \geq 16 \quad (VII),$$

w: width of the sensor portion [mm], and
$t_{init}$: initial thickness of the sensor portion [mm].

Advantageous Effects of Invention

According to the present invention, it is possible to obtain a corrosion sensor having excellent precision of corrosion loss measurement.

BRIEF DESCRIPTION OF DRAWINGS

FIG. 4 is a graph showing a relation between an average corrosion loss and a maximum corrosion loss.

FIG. 5 is a graph showing a relation between an average corrosion loss and a range.

DESCRIPTION OF EMBODIMENTS

Below described is a suitable embodiment of the present invention.

The following description also covers a method of producing a corrosion sensor, and a corrosion sensor in addition to a method of designing a corrosion sensor.

<Basic Configuration of Corrosion Sensor>

A suitable example of a basic configuration of the electric resistance type corrosion sensor is described with reference to FIGS. 1 to 3.

Figure 1:
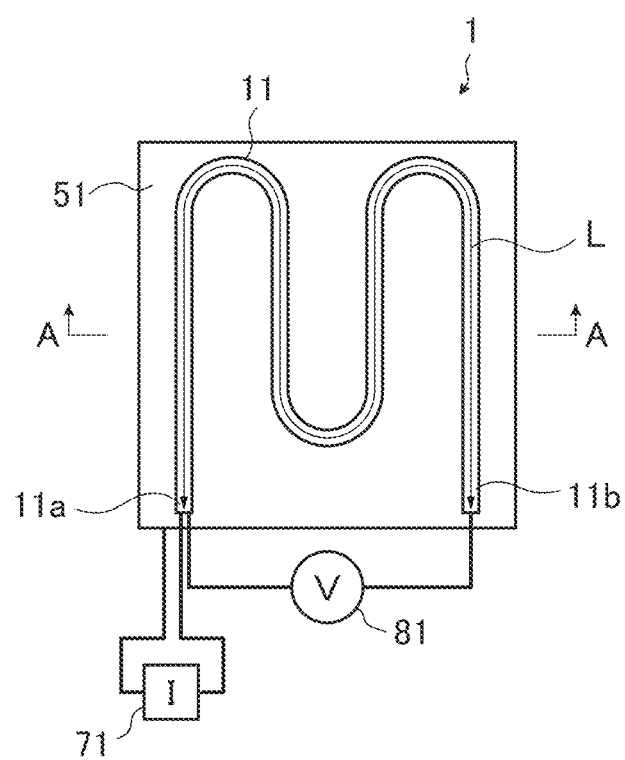
FIG. 1 is a plan view showing an electric resistance type corrosion sensor.
Figure 2:
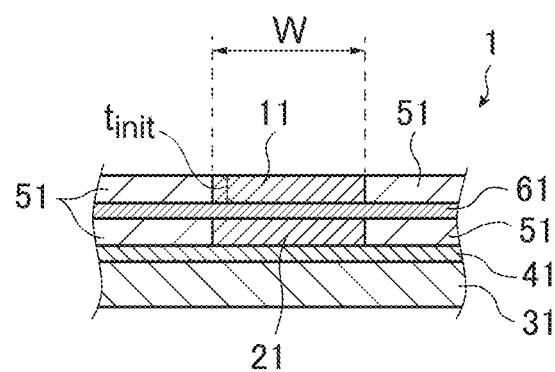
FIG. 2 is a cross-sectional view taken along line A-A of FIG. 1.
Figure 3:
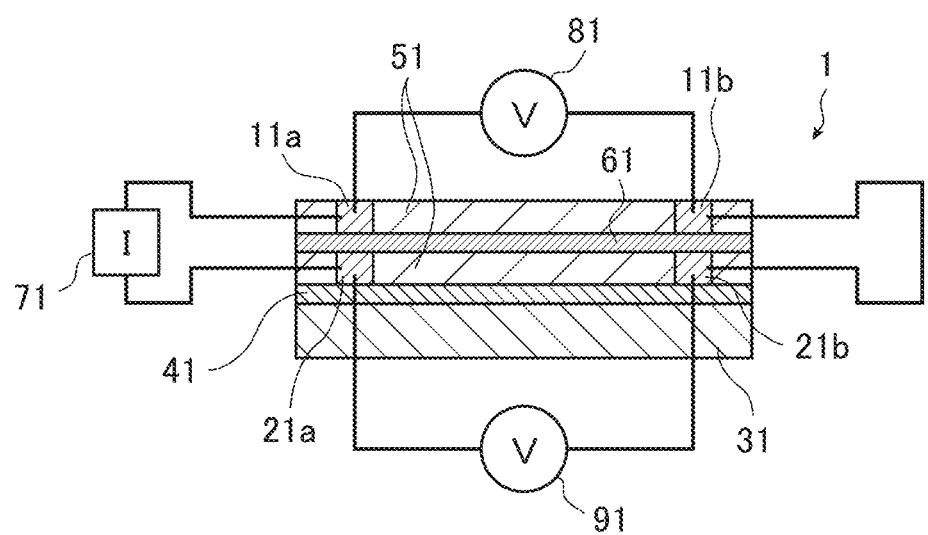
FIG. 3 is a cross-sectional view of the corrosion sensor for illustration of a state of connection between a current source and a voltage measurement portion.

Meanwhile, the corrosion sensor described with reference to FIGS. 1 to 3 is a mere example, and the corrosion sensor is not limited thereto.

FIG. 1 is a plan view showing a corrosion sensor 1. FIG. 2 is a cross-sectional view taken along line A-A of FIG. 1.

The electric resistance type corrosion sensor 1 includes a sensor portion 11 that is exposed to an arbitrary environment, and a reference portion 21 that is isolated from the arbitrary environment to which the sensor portion 11 is exposed.

The "arbitrary environment" to which the sensor portion 11 is exposed refers to a concept encompassing various environments including a "corrosive environment" where the sensor portion 11 corrodes.

That is, the corrosion sensor 1 may be used not only in a corrosive environment where the sensor portion 11 corrodes but also in an environment where the sensor portion 11 does not corrode.

As shown in FIG. 2, on one surface of a plate-like substrate 31, a reference portion 21 formed of an electric conductor is disposed via an insulating sheet 41. On one surface, opposite from the substrate 31, of the reference portion 21, a sensor portion 11 formed of an electric conductor is disposed via an insulator 61. In other words, the sensor portion 11 and the reference portion 21 are laminated via the insulator 61.

The sensor portion 11 and the reference portion 21 each have a cross section of a rectangular shape (including a square shape) having a predetermined thickness. The opposite lateral surfaces of the sensor portion 11 and the reference portion 21 are covered by an insulating resin 51.

As shown in FIG. 2, when the corrosion sensor 1 is viewed in cross section, the opposite lateral surfaces as well as the upper and lower surfaces of the reference portion 21 of rectangular shape are covered by respective members. Accordingly, even when the corrosion sensor 1 is present in an arbitrary environment, the reference portion 21 is isolated from this arbitrary environment.

In the meantime, as shown in FIG. 2, when the corrosion sensor 1 is viewed in cross section, while the opposite lateral surfaces and the lower surface of the sensor portion 11 of rectangular shape are covered by respective members, but the upper surface thereof is exposed. Accordingly, when the corrosion sensor 1 is present in an arbitrary environment, the upper surface of the sensor portion 11 is exposed to this arbitrary environment. In the sensor portion 11 with the upper surface thereof being exposed, corrosion proceeds in the thickness direction (direction from the upper surface toward the lower surface) of the sensor portion 11.

Suitable examples of the substrate 31 include a metal sheet such as a stainless steel sheet because of its handleability, but the substrate 31 is not limited thereto and may be an insulator such as glass, ceramics, or plastic, or a semiconductor such as a silicon wafer.

The insulating sheet 41 disposed on the substrate 31 is not particularly limited and can make use of a conventionally known material examples of which include a plastic film made of, e.g., polyethylene terephthalate (PET).

The insulating sheet 41 should have a thickness (vertical distance in FIG. 2, the same applies hereinafter) with which the substrate 31 being, e.g., a stainless steel sheet can be insulated from the reference portion 21 being an electric conductor, and the thickness is not less than 5 µm, for example.

When an electric conductor (such as a metal sheet) and a semiconductor are used for the substrate 31, the insulating sheet 41 is required, whereas, when an insulator is used for the substrate 31, the insulating sheet 41 is not required.

The material of the resin 51 is not particularly limited and can make use of a conventionally known material, and examples thereof include an epoxy resin and an acrylic resin. The thickness of the resin 51 follows the thickness of each of the sensor portion 11 and the reference portion 21.

The material of the insulator 61 is not particularly limited as long as the material does not allow the sensor portion 11 to be electrically connected to the reference portion 21, and examples thereof include glass, ceramics, plastic (synthetic resin), and a natural resin. If the insulator 61 has low thermal conductivity, a temperature difference is likely to generate between the sensor portion 11 and the reference portion 21. Accordingly, it is preferable to select a material having as high thermal conductivity as possible.

When the insulator 61 is too thick, the thermal conductivity would deteriorate, whereas, when the insulator 61 is too thin, there would be a higher risk of electrical short circuit.

A suitable thickness of the insulator 61 varies depending on the material thereof and is preferably, for example, 5 to 200 µm, when the insulator 61 is formed of a plastic film of polyvinyl chloride, polyethylene, polypropylene, or the like.

The insulator 61 is preferably adhered to the sensor portion 11 and the reference portion 21 without a gap therebetween. This is because, if a gap is formed, thermal conductivity is likely to be impaired. Accordingly, it is preferable that the insulator 61, the sensor portion 11, and the reference portion 21 are compression-bonded together with a sufficient force or bonded together with the use of a thermally conductive adhesive. In the bonding process, it is preferable that surfaces to be bonded are sufficiently washed until no dirt or dust remains thereon.

The electric conductor constituting the sensor portion 11 is selected depending on targets of corrosion loss measurement and is not particularly limited, and examples thereof include iron and iron alloys.

The amount of iron contained in an iron alloy is preferably not less than 90 mass %. Elements except iron that are contained in an iron alloy are exemplified by at least one element selected from the group consisting of carbon, silicon, manganese, phosphorus, and sulfur; and elements such as copper and nickel that improve corrosion resistance.

The electric conductor constituting the reference portion 21 is preferably the same material as the electric conductor constituting the sensor portion 11.

The electric conductor constituting the sensor portion 11 and the reference portion 21 preferably has an elongated shape with a predetermined length since changes in their electric resistance values are measured, and an example of such shape is a meandering shape bending at constant intervals as shown in FIG. 1.

The shape of the reference portion 21 is preferably identical to that of the sensor portion 11, and, for example, the reference portion 21 may have the same cross-sectional area as that of the sensor portion 11 and have a shorter length than that of the sensor portion 11. With the length being shorter than that of the sensor portion 11, the reference portion 21 can expect an effect of improving followability to follow a temperature change in the sensor portion 11.

While the sensor portion 11 and the reference portion 21 are laminated via the insulator 61, it suffices if the portions are at least partly laminated on one another.

FIG. 3 is a cross-sectional view of the corrosion sensor 1 for describing the connection state between a current source 71 and a voltage measurement portion 81.

As shown in FIG. 3, a terminal 11a being one end of the sensor portion 11 and a terminal 11b being another end of the sensor portion 11 are connected to the voltage measurement portion 81, and a terminal 21a being one end of the reference portion 21 and a terminal 21b being another end of the reference portion 21 are connected to a voltage measurement portion 91. The terminal 11b of the sensor portion 11 and the terminal 21b of the reference portion 21 are electrically connected to each other, and the terminal 11a of the sensor portion 11 and the terminal 21a of the reference portion 21 are connected to the current source 71.

In the corrosion sensor 1 as above, a constant current is applied from the current source 71 to measure a voltage, whereby an electric resistance value of each of the sensor portion 11 and the reference portion 21 is obtained.

In a case where the sensor portion 11 has corrosion that has advanced over time due to exposure to an arbitrary environment, the electric resistance value of the sensor portion 11 increases over time from the initial value. On the other hand, since the reference portion 21 is isolated from the environment to which the sensor portion 11 is exposed, corrosion of the reference portion 21 does not advance, and the electric resistance value of the reference portion 21 basically stays unchanged from the initial value with the exception of a change caused by a temperature change described later.

In general, advancement of corrosion of the sensor portion 11 is associated with an increase in an electric resistance value presumably because of the following reason.

As corrosion advances, the electric conductor constituting the sensor portion 11 reduces its thickness in the thickness direction, having an area exposed to an arbitrary environment as a starting point. Part of the electric conductor corresponding to the thickness reduction is lost from a surface or replaced with a corrosion product which remains on a surface. In many cases, the corrosion product is non-conductive, or even if the corrosion product is conductive, electric conductivity thereof is much lower than that of the original electric conductor. Accordingly, an increase in an electric resistance value due to corrosion is deemed to be caused by the thickness reduction of the electric conductor constituting the sensor portion 11.

As described above, in the corrosion sensor 1, electric resistance values of the sensor portion 11 and the reference portion 21 are obtained at regular intervals, and a corrosion loss (corrosion depth) of the sensor portion 11 is calculated (converted) based on the obtained electrical resistance values. More specifically, the conversion formula for a corrosion loss is expressed by Formula (IV) below.

$$CD = t_{init}\{(R_{ref,\ init}/R_{sens,\ init}) - (R_{ref}/R_{sens})\} \quad (IV)$$

CD: corrosion loss (corrosion depth) [μm]
$t_{init}$: initial thickness of sensor portion [μm]
$R_{ref,\ init}$: initial electric resistance value of reference portion [Ω]
$R_{sens,\ init}$: initial electric resistance value of sensor portion [Ω]
$R_{ref}$: electric resistance value of reference portion at time of measurement [Ω]
$R_{sens}$: electric resistance value of sensor portion at time of measurement [Ω]

Based on the above Formula (IV), a corrosion loss is hypothetically calculated.

For instance, in a case where the sensor portion 11 and the reference portion 21 both have an initial thickness of "100 μm," an initial electric resistance value ($R_{ref,\ init}$) of the reference portion 21 and an initial electric resistance value ($R_{sens,\ init}$) of the sensor portion 11 are both "0.1Ω", and an electric resistance value of the reference portion 21 at the time of measurement ($R_{ref}$) stays the same as the initial value of "0.1Ω" while an electric resistance value ($R_{sens}$) of the sensor portion 11 increases to "0.11Ω" as corrosion advances, the corrosion loss is calculated as 100×{(0.1/0.1)−(0.1/0.11)}, resulting in "9.1 μm," according to the above Formula (IV).

At this time, in the corrosion sensor 1, temperature compensation is preferably performed.

That is, in measurement of a corrosion loss, hypothesizing that in a case where the electric resistance value of the reference portion 21 changes, this change is caused by a temperature change, the measured corrosion loss is preferably compensated based on this change.

Generally, metal has a higher electric resistance as temperature increases. Hence, in the above-described hypothesis, for example, the temperature has increased from the initial temperature, and an electric resistance value ($R_{sens}$) of the sensor portion 11 at the time of measurement is not "0.11Ω" but "0.121Ω" with an increase of 10%. In this case, calculation of 100×{(0.1/0.1)−(0.1/0.121)} based on the above Formula (IV) would result in a corrosion loss of "17 μm," which is largely different from the corrosion loss "9.1 μm" in situ.

Meanwhile, if, for example, an electric resistance value ($R_{ref}$) of the reference portion 21 is similarly changed from "0.1Ω" to "0.11Ω" with an increase of 10% due to a temperature increase, a corrosion loss can be compensated in accordance with this change. In other words, a corrosion loss is calculated as 100×{(0.1/0.1)−(0.11/0.121)} to result in "9.1 μm" based on the above Formula (IV), enabling to obtain the same result as in a case where no temperature change occurs.

<Thickness of Sensor Portion>

First, the thickness (initial thickness) of the sensor portion 11 is described. The thickness of the sensor portion 11 is a vertical distance in FIG. 2.

It is preferable that corrosion does not penetrate through the sensor portion 11 during measurement of a corrosion loss.

The present inventors temporally measured average corrosion losses and maximum corrosion losses of the steel sensor portion 11 having been exposed to a corrosive environment in the air, and plotted them in a graph.

FIG. 4 is a graph showing a relation between the average corrosion losses and the maximum corrosion losses.

A corrosive surface (surface which is exposed, and on which corrosion advances) of the sensor portion 11 is in fact an uneven surface. A corrosion loss of the sensor portion 11 when the corrosive surface is regarded as a flat surface is called "average corrosion loss." A corrosion loss (corrosion depth) of the deepest recessed part in the corrosive surface of the sensor portion 11 is called "maximum corrosion loss."

As the graph in FIG. 4 shows, the maximum corrosion loss (unit: mm) was approximately 1.5 times the average corrosion loss (unit: mm). Meanwhile, some variations were seen in the plot.

Accordingly, the initial thickness of the sensor portion 11 is preferably set to satisfy Formula (I) below.

$$t_{init} \geq (2 \times t_{limit}) \tag{I}$$

$t_{init}$: initial thickness of sensor portion [mm]
$t_{limit}$: maximum corrosion loss to be measured [mm]

With this constitution, the initial thickness of the sensor portion 11 is sufficiently larger (thicker) than the maximum corrosion loss to be measured, and corrosion does not penetrate through the sensor portion 11 during measurement of a corrosion loss.

<Width of Sensor Portion>

Next, the width of the sensor portion 11 is described. The width of the sensor portion 11 is a horizontal distance in FIG. 2.

When a diameter of a recessed part formed in a corrosive surface of the sensor portion 11 exceeds the width of the sensor portion 11, as compared to other parts, the sensor portion 11 at this part has the cross-sectional area extremely decreasing and the electric resistance value increasing to thereby dominate the electric resistance value of the entire sensor portion 11. In this case, a larger electric resistance value than the electric resistance value of the actual average corrosion loss may be exhibited.

The inventors studied an index of the size of a recessed part formed in the corrosive surface of the sensor portion 11. The corrosive surface of the sensor portion 11 has quite complex irregularities. Hence, it is difficult to define the index based on, for example, the average value or the maximum value of a corrosion loss of the sensor portion 11, or the diameters of projections and recesses.

Accordingly, the inventors focused on spatial statistics being a method of analyzing random phenomenon in a space, and attempted to apply the spatial statistics to the index.

For instance, the distribution of corrosion losses (corrosion depths) is obtained using a laser displacement meter or the like, and discretization is performed using grid coordinates of the obtained distribution. Subsequently, an empirical semivariogram is plotted with the number of bins being specified based on Formula (V) below. A theoretical semivariogram (spherical model) is then applied to the empirical semivariogram based on Formula (VI) below. Accordingly, the "range" showing an influence range of spatial autocorrelation and the "sill" showing spatial dependence can be calculated. The range corresponds to a range in which a corrosion loss (corrosion depth) influences, that is, corresponds to a diameter of a recessed part.

[Mathematical Formula 1]

$$\gamma(h) = \frac{1}{2N(h)} \sum_{i=1}^{N(h)} (z_j - z_k)^2 \tag{V}$$

Y (h): value of semivariogram
h: Euclidean distance
N (h): pair of all points having Euclidean distance h
$Z_j$, $Z_k$: corrosion depth of point in pair having Euclidean distance h

[Mathematical Formula 2]

$$WRSS(\theta) = \sum_{k=1}^{K} \frac{|N(h_k)|}{\gamma(h_k; \theta)^2} (\gamma(h_k) - \gamma(h_k; \theta))^2 \tag{VI}$$

$|N(h_k)|$: total number of pairs having Euclidean distance (lag) of $h_k$
$Y(h_k)$: value of empirical variogram of lag k [mm$^2$]
$Y(h_k;\theta)$: value at lag k of theoretical variogram model (spherical model)

The inventors temporally measured the average corrosion loss and the range of the steel sensor portion 11 having been exposed to a corrosive environment in the air and plotted them in a graph.

FIG. 5 is a graph showing a relation between the average corrosion loss and the range.

As the graph in FIG. 5 shows, the range (unit: mm) was approximately 15 times the average corrosion loss (unit: mm). Meanwhile, some variations were seen in the plot.

Accordingly, the width of the sensor portion 11 is set to satisfy Formula (II) below.

$$w \geq (32 \times t_{limit}) \tag{II}$$

w: width of sensor portion [mm]
$t_{limit}$: maximum corrosion loss to be measured [mm]

With this constitution, the width of the sensor portion 11 is sufficiently larger than the maximum corrosion loss to be measured, and the sensor portion 11 is avoided from having the cross-sectional area extremely decreasing and the electric resistance value increasing. As a result, precision of the corrosion loss measurement is excellent.

Because the precision of the corrosion loss measurement is more excellent, the width and the initial thickness of the sensor portion 11 are preferably set to satisfy Formula (VII) below.

$$(w/t_{init}) \geq 16 \tag{VII}$$

w: width of sensor portion [mm]
$t_{init}$: initial thickness of sensor portion [mm]

In other words, the corrosion sensor 1 preferably includes the sensor portion 11 with the width and the thickness satisfying Formula (VII) above. In this case, the "initial thickness" in the description of Formula (VII) above should read "thickness."

<Length of Sensor Portion>

Next, the length of the sensor portion 11 is described. The length of the sensor portion 11 is a centerline distance passing the center of width of the sensor portion 11.

As described above, a corrosion loss of the sensor portion 11 is measured using a voltage during application of a constant current. With the longer length of the sensor portion 11, the electric resistance value becomes larger. That is, the voltage increases so that the precision of corrosion loss measurement is more excellent. The voltage varies also depending on a constant current value.

Here, a general formula "E=IR" can be converted to a formula "E={ρ×L/(w×t)}×I," and further to "E/ρ={L/(w×t)}×I" (E: voltage value, R: resistance value, I: current value, t: thickness of sensor portion, ρ: electric resistance of sensor portion).

In view of a common value of p (electric resistance) of the sensor portion, and taking into consideration a sufficiently high E (voltage value) capable of obtaining good measurement precision, the value of "E/ρ" can be led to $10^3$.

In other words, because the precision of corrosion loss measurement is more excellent, the length of the sensor portion 11 is preferably set to satisfy Formula (III) below.

$$10^3 \leq \{L/(w \times t_{init})\} \times I \quad \text{(III)}$$

$t_{init}$: initial thickness of sensor portion 11 [mm]
w: width of sensor portion 11 [mm]
L: length of sensor portion 11 [mm]
I: current value [mA]

From the view points of handleability of the corrosion sensor 1 and workability of the sensor portion 11, it is preferable to satisfy L×w≥40,000 mm², and $t_{init}$≤3 mm.

EXAMPLES

The invention is specifically described below with reference to Examples. However, the present invention should not be construed as being limited to the following examples.

<No. 1>

<<Preparation of Corrosion Sensor for Evaluation (Evaluation Sensor)>>

As with the corrosion sensor in FIGS. 1 to 3, the corrosion sensor 1 for evaluation (hereinafter, also referred to as "evaluation sensor") was prepared.

More specifically, on a substrate 31 being a stainless steel sheet (65 mm×60 mm), the insulating sheet 41 made of polyethylene terephthalate (Mylar sheet manufactured by DuPont, thickness: 100 μm) was disposed, and the reference portion 21 was disposed thereon. On the insulating sheet 41, the resin 51 being an epoxy resin was flatly laid to have a thickness of the reference portion 21, thereby covering the opposite lateral surfaces of the reference portion 21. The insulator 61 being a plastic film (polyvinyl chloride, thickness: 100 μm) was disposed thereon, and, further, the sensor portion 11 was disposed thereon such that the sensor portion 11 and the reference portion 21 are laminated via the insulator 61. On the insulator 61, the resin 51 being an epoxy resin was flatly laid to have a thickness of the sensor portion 11, thereby covering the opposite lateral surfaces of the sensor portion 11.

The initial thickness $t_{init}$, the width w, and the length L of the sensor portion 11 of the prepared evaluation sensor are shown in Table 1 below. The reference portion 12 had the same shape as that of the sensor portion 11.

As the electric conductor constituting the sensor portion 11 and the reference portion 21, an iron alloy (carbon: 0.16 mass %, silicon: 0.34 mass %, manganese: 1.44 mass %, phosphorus: 0.016 mass %, sulfur: 0.003 mass %, balance being Fe and inevitable impurities) was used. To be more specific, the sensor portion 11 and the reference portion 21 were prepared from a commercially available rolled steel for welded structure SM490A that is standardized in JIS G 3114.

<<Preparation of Corrosion Sensor for Reference (Reference Sensor)>>

Aside from the evaluation sensor, the corrosion sensor 1 for reference (hereinafter, also referred to as "reference sensor") was prepared.

The reference sensor was prepared as with the evaluation sensor except that the sensor portion 11 had the initial thickness $t_{init}$ of 3 mm, the width w of 70 mm, and the length L of 150 mm.

In other words, the sensor portion 11 of the reference sensor had such a sufficiently large size that corrosion would not penetrate through the sensor portion 11 or the cross-sectional area of the sensor portion 11 would not significantly decrease during the test to be described below.

<<Test>>

Using the evaluation sensor and the reference sensor thus prepared, the test according to "Determination of resistance to cyclic corrosion conditions-salt fog/dry/humidity" of "JIS K 5600-7-9."

More specifically, each corrosion sensor 1 was placed in an environment, in which a cycle of salt fog (35° C., NaCl concentration 5%, 2 hours)→dry (60° C., humidity 25%, 4 hours)→humidity (50° C., humidity 95%, 2 hours) was repeated, for up to 10 days.

During the test, a constant current at each of the current values I (unit: mA) shown in Table 1 below (10 mA in No. 1) was applied from the current source 71 at 10 minute intervals, the electric resistance values of the sensor portion 11 and the reference portion 21 were determined, and a corrosion loss (corrosion depth) of the sensor portion 11 was calculated based on the foregoing Formula (IV).

The test of the reference sensor was terminated when the measured corrosion loss (corrosion depth) reached $t_{limit}$ (maximum corrosion loss to be measured) shown in Table 1 below. The electric resistance value of the sensor portion 11 of the reference sensor at the time of test termination was regarded as "$R_s$."

Meanwhile, the test of the evaluation sensor was terminated when the electric resistance value of the sensor portion 11 reached "$R_s$," and a corrosion loss (corrosion depth) of the sensor portion 11 was determined.

The divergence degree (unit: %) of the corrosion loss of the evaluation sensor with respect to the corrosion loss of the reference sensor at the time of the test termination was determined.

The same test was repeated three times (Test 1 to Test 3). For the case where the divergence degree was less than +5% in all of Test 1 to Test 3, "YES" is shown in Table 1 below, whereas for the case where the divergence degree was not less than +5% in any one of Test 1 to Test 3, "NO" is shown in the table. The case of "YES" can be evaluated as having excellent precision of the corrosion loss measurement.

Table 1 below also shows whether the evaluation sensor satisfies the foregoing Formulae (I) to (III). The case where the formulae are satisfied is shown as "YES," whereas the case where the formulae are not satisfied as "NO."

<<Corrosion Loss Compared to Preceding Day>>

For the case where a corrosion loss for one day did not fall below the corrosion loss of the preceding day throughout the forgoing test, "YES" was shown, whereas for the case where the corrosion loss fell below the corrosion loss of the preceding day, "NO" was shown in Table 1 below. The case of "YES" can be evaluated as having excellent precision of the corrosion loss measurement.

<No. 2 to No. 19>

As with No. 1, the evaluation sensor and the reference sensor were prepared and were subjected to evaluation. The results are shown in Table 1 below.

TABLE 1

| No. | $t_{init}$ [mm] | w [mm] | L [mm] | $t_{limit}$ [mm] | I [mA] | Formula (I) $2 \times t_{limit}$ | Y/N | Formula (II) $32 \times t_{limit}$ | Y/N | Formula (III) $\{L/(w \times t_{init})\} \times I$ | Y/N |
|---|---|---|---|---|---|---|---|---|---|---|---|
| 1 | 0.025 | 1 | 10 | 0.005 | 10 | 0.01 | Y | 0.16 | N | 20000 | Y |
| 2 | 0.025 | 1 | 20 | 0.005 | 10 | 0.01 | Y | 0.16 | N | 40000 | Y |
| 3 | 0.025 | 0.3 | 20 | 0.01 | 10 | 0.02 | Y | 0.32 | N | 66667 | Y |
| 4 | 0.025 | 1 | 20 | 0.01 | 10 | 0.02 | Y | 0.32 | Y | 20000 | Y |
| 5 | 0.025 | 1 | 10 | 0.01 | 10 | 0.02 | Y | 0.32 | Y | 10000 | Y |
| 6 | 0.025 | 0.3 | 20 | 0.025 | 10 | 0.05 | N | 0.8 | N | 26667 | Y |
| 7 | 0.1 | 0.3 | 50 | 0.025 | 10 | 0.05 | Y | 0.8 | N | 66667 | Y |
| 8 | 0.1 | 2 | 50 | 0.025 | 10 | 0.05 | Y | 0.8 | Y | 10000 | Y |
| 9 | 0.1 | 1 | 50 | 0.04 | 10 | 0.08 | Y | 1.28 | N | 12500 | Y |
| 10 | 0.1 | 2 | 50 | 0.04 | 10 | 0.08 | Y | 1.28 | Y | 6250 | Y |
| 11 | 0.1 | 1 | 50 | 0.1 | 10 | 0.2 | N | 3.2 | N | 5000 | Y |
| 12 | 0.25 | 1 | 50 | 0.05 | 10 | 0.1 | Y | 1.6 | N | 10000 | Y |
| 13 | 0.25 | 4 | 65 | 0.05 | 20 | 0.1 | Y | 1.6 | Y | 6500 | Y |
| 14 | 0.25 | 1 | 65 | 0.1 | 10 | 0.2 | Y | 3.2 | N | 6500 | Y |
| 15 | 0.25 | 4 | 150 | 0.1 | 20 | 0.2 | Y | 3.2 | Y | 7500 | Y |
| 16 | 0.3 | 1 | 150 | 0.05 | 10 | 0.1 | Y | 1.6 | N | 30000 | Y |
| 17 | 0.3 | 4 | 150 | 0.05 | 10 | 0.1 | Y | 1.6 | Y | 7500 | Y |
| 18 | 0.3 | 10 | 150 | 0.1 | 20 | 0.2 | Y | 3.2 | Y | 3000 | Y |
| 19 | 0.5 | 10 | 500 | 0.25 | 10 | 0.5 | Y | 8 | Y | 2000 | Y |

| No. | Formula (VII) $w/t_{init}$ | Y/N | Test 1 | Test 2 | Test 3 | Divergence degree of corrosion loss [%] Y/N | Average of absolute values | Comparison with preceding day Y/N | Remarks |
|---|---|---|---|---|---|---|---|---|---|
| 1 | 40 | Y | −1.1 | 2.6 | 3.2 | Y | 2.3 | Y | E |
| 2 | 40 | Y | −2.4 | 0.6 | 3.3 | Y | 2.1 | Y | E |
| 3 | 12 | N | 3.5 | 4.0 | 19.2 | N | 8.9 | Y | CE |
| 4 | 40 | Y | −3.3 | 0.6 | 1.0 | Y | 1.6 | Y | E |
| 5 | 40 | Y | −3.6 | 0.1 | 1.1 | Y | 1.6 | Y | E |
| 6 | 12 | N | 4.6 | 7.9 | 18.3 | N | 10.3 | Y | CE |
| 7 | 3 | N | 5.5 | 6.9 | 20.1 | N | 10.8 | Y | CE |
| 8 | 20 | Y | −2.2 | −0.2 | 2.6 | Y | 1.7 | Y | E |
| 9 | 10 | N | 2.9 | 8.8 | 12.2 | N | 8.0 | Y | CE |
| 10 | 20 | Y | −2.1 | −1.1 | 0.9 | Y | 1.4 | Y | E |
| 11 | 10 | N | 25.1 | 48.3 | 81.2 | N | 51.5 | Y | CE |
| 12 | 4 | N | 21.2 | 23.3 | 29.6 | N | 24.7 | Y | CE |
| 13 | 16 | Y | −2.9 | 0.1 | 3.3 | Y | 2.1 | Y | E |
| 14 | 4 | N | 41.1 | 50.6 | 79.0 | N | 56.9 | Y | CE |
| 15 | 16 | Y | −3.8 | −2.1 | 2.6 | Y | 2.8 | Y | E |
| 16 | 3 | N | 5.9 | 8.2 | 11.1 | N | 8.4 | Y | CE |
| 17 | 13 | N | −4.3 | 2.2 | 3.9 | Y | 3.5 | Y | E |
| 18 | 33 | Y | −4.2 | 2.1 | 2.8 | Y | 3.0 | Y | E |
| 19 | 20 | Y | −1.1 | 2.3 | 4.1 | Y | 2.5 | Y | E |

Y: Yes
N: No
E: Example
CE: Comparative Example

<Summary of Evaluation Results>

Table 1 above reveals that when Formula (II) was satisfied, the divergence degree was less than +5% in all of Test 1 to Test 3, and precision of the corrosion loss measurement was excellent.

When Formula (II) is not satisfied, on the other hand, the divergence degree was not less than +5% in any of Test 1 to Test 3.

REFERENCE SIGNS LIST

1: corrosion sensor
11: sensor portion
11a, 11b: terminal of sensor portion
21: reference portion
21a, 21b: terminal of reference portion
31: substrate
41: insulating sheet
51: resin
61: insulator
71: current source
81: voltage measurement portion
91: voltage measurement portion

The invention claimed is:

1. A method of producing a corrosion sensor,
the corrosion sensor being an electric resistance type corrosion sensor, the electric resistance type corrosion sensor (i) including a sensor portion with an upper surface exposed to an arbitrary environment and formed of an electric conductor, and a reference portion isolated from the arbitrary environment and formed of an electric conductor, and measuring (ii) being configured to measure a corrosion loss of the sensor portion based on an electric resistance value of the reference portion and an electric resistance value of the sensor portion, the sensor portion having a length, L, that is a longest dimension of the sensor portion exposed on the upper surface, a width, w, that is a shorter dimension of the sensor portion exposed on the upper surface and extending transverse to the length, L, and a thickness, $t_{init}$, that extends orthogonally to the length, L, and width, w, the method including:

determining an expected maximum corrosion loss of the sensor portion, $t_{limit}$, to be measured;

setting the width, w, of the sensor portion to satisfy Formula (II) below:

$w \geq (32 \times t_{limit})$ ... (II), in which $t_{limit}$ and w are in units of mm;

setting the thickness, $t_{init}$, of the sensor portion to satisfy Formula (I) below: $t_{init} \geq (2 \times t_{limit})$ ... (I), in which $t_{limit}$ and $t_{init}$ are in units of mm; and making the corrosion sensor in which the sensor portion has the set width, w, and the set thickness, $t_{init}$.

2. The method of producing a corrosion sensor according to claim 1, comprising setting the length of the sensor portion to satisfy Formula (III) below:

$10^3 \leq \{L/(w \times t_{init})\} \times I$ ... (III), in which L, w, and $t_{init}$ are in units of mm, and I is a constant current value to be applied to the corrosion sensor in units of mA; and making the corrosion sensor in which the sensor portion has the set length, L.

3. The method of producing a corrosion sensor according to claim 2, comprising setting the width and the thickness of the sensor portion are set to satisfy Formula (VII) below:

$(w/t_{init}) \geq 16$ ... (VII), in which w and $t_{init}$ and w are in units of mm.

4. The method of producing a corrosion sensor according to claim 1, comprising setting the width and the thickness of the sensor portion to satisfy Formula (VII) below:

$(w/t_{init}) \geq 16$ ... (VII), in which w and $t_{init}$ and w are in units of mm.

5. A method of producing a corrosion sensor according to claim 1, wherein making the corrosion sensor comprises:

disposing the reference portion on a surface of a plate-like substrate, disposing an insulator on a surface of the reference portion that is opposite the substrate;

disposing the sensor portion on a surface of the insulator that is opposite the reference portion;

covering opposite lateral surfaces of the sensor portion and the reference portion with an insulating resin.

6. A corrosion sensor that is produced according to the method of claim 5.

7. A corrosion sensor that is produced according to the method of claim 1.

8. A corrosion sensor that is an electric resistance type corrosion sensor including a sensor portion with an upper surface exposed to an arbitrary environment and formed of an electric conductor, and a reference portion isolated from the arbitrary environment and formed of an electric conductor, the corrosion sensor being configured to measure a corrosion loss of the sensor portion based on an electric resistance value of the reference portion and an electric resistance value of the sensor portion, the sensor portion having a length, L, that is a longest dimension of the sensor portion exposed on the upper surface, a width, w, that is a shorter dimension of the sensor portion exposed on the upper surface and extending transverse to the length, L, and a thickness, $t_{init}$, that extends orthogonally to the length, L, and width, w, wherein the width and the thickness of the sensor portion satisfy Formula (VII) below:

$40 \geq (w/t_{init}) \geq 16$ ... (VII), in which w and $t_{init}$ and w are in units of mm.

* * * * *